(12) United States Patent
Reynolds (10) Patent No.: US 12,552,243 B2
(45) Date of Patent: Feb. 17, 2026

(54) AIRFLOW CONTROL FOR HEAT EXCHANGER IN VEHICLES

(71) Applicant: Honda Motor Co., Ltd., Tokyo (JP)

(72) Inventor: Brian R Reynolds, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 386 days.

(21) Appl. No.: 18/190,793

(22) Filed: Mar. 27, 2023

(65) Prior Publication Data

US 2024/0326554 A1    Oct. 3, 2024

(51) Int. Cl.
*B60K 11/08*    (2006.01)
*B60K 11/04*    (2006.01)

(52) U.S. Cl.
CPC ............ *B60K 11/085* (2013.01); *B60K 11/04* (2013.01)

(58) Field of Classification Search
CPC ............................. B60K 11/085; B60K 11/04
See application file for complete search history.

(56) References Cited

U.S. PATENT DOCUMENTS

| | | | |
|---|---|---|---|
| 5,038,723 A | 8/1991 | Bandlow et al. | |
| 8,936,121 B2 | 1/2015 | Vacca et al. | |
| 9,216,644 B2 | 12/2015 | Cardile et al. | |
| 10,166,859 B1* | 1/2019 | Del Gaizo | B62D 37/02 |
| 10,202,049 B2 | 2/2019 | Nagaosa | |
| 2010/0147611 A1* | 6/2010 | Amano | F01P 7/12 |
| | | | 180/68.1 |
| 2010/0243351 A1* | 9/2010 | Sakai | F01P 7/10 |
| | | | 296/180.5 |
| 2011/0308763 A1* | 12/2011 | Charnesky | B60H 1/3229 |
| | | | 165/41 |
| 2012/0110909 A1* | 5/2012 | Crane | B29C 48/151 |
| | | | 49/70 |
| 2014/0299077 A1* | 10/2014 | Sowards | F01P 7/10 |
| | | | 123/41.05 |
| 2015/0118949 A1* | 4/2015 | Nam | F01P 1/06 |
| | | | 454/155 |
| 2017/0341506 A1* | 11/2017 | Wiech | B60K 11/04 |
| 2020/0086734 A1* | 3/2020 | Sedlak | B60K 11/085 |
| 2021/0402843 A1* | 12/2021 | Moradnia | B60K 11/04 |
| 2022/0176806 A1* | 6/2022 | Moradnia | B60K 11/08 |
| 2023/0398857 A1* | 12/2023 | Mammeri | B60K 11/085 |
| 2024/0351431 A1* | 10/2024 | Manhire | B60K 11/04 |

FOREIGN PATENT DOCUMENTS

| | | |
|---|---|---|
| DE | 102011013856 B4 | 8/2013 |
| EP | 2335963 B1 | 3/2012 |
| JP | 2010089523 A | 4/2010 |
| JP | 6349115 B2 | 6/2018 |
| KR | 100671244 B1 | 1/2007 |
| KR | 20210105623 A | 8/2021 |
| WO | 2015129348 A1 | 9/2015 |

\* cited by examiner

*Primary Examiner* — Brian L Swenson
(74) *Attorney, Agent, or Firm* — Morgan Lincoln; American Honda Motor Co., Inc.

(57) ABSTRACT

A system is provided. The system includes a first flap coupled to a first portion of a duct associated with a heat exchanger of a vehicle. The first flap forms a first airflow path towards the heat exchanger. The system further includes a second flap coupled to a second portion of the duct associated with the heat exchanger of the vehicle. The second flap forms a second airflow path towards the heat exchanger. The first airflow path is different from the second airflow path.

19 Claims, 5 Drawing Sheets

```
┌─────────────────────────────────────────────────────────────────────────┐
│ Control first flap, coupled to first portion of duct associated with heat exchanger │
│ of vehicle, to releasably open first flap and form first airflow path towards heat │
│                           exchanger 502                                 │
└─────────────────────────────────────────────────────────────────────────┘
                                    │
                                    ▼
┌─────────────────────────────────────────────────────────────────────────┐
│  Control second flap, coupled to second portion of duct associated with heat │
│ exchanger of vehicle, to releasably open second flap and form second airflow │
│                   path towards heat exchanger 504                       │
└─────────────────────────────────────────────────────────────────────────┘
```

FIG. 5

AIRFLOW CONTROL FOR HEAT EXCHANGER IN VEHICLES

BACKGROUND

Vehicles have heat exchangers to cool components (such as, engines, motors, etc.) of the vehicle based on a flow of fluid (such as air) from a surrounding environment. The heat exchangers may generally include ducts to receive the air flow from the surrounding environment to cool the components of the vehicle. The ducts may include grille shutters that may control the air flow to the components of the vehicle. In certain instances, the grille shutters may fail to open and halts the air flow to the components of the vehicle. In such instances, the components of the vehicle may overheat. To avoid overheating of the components of the vehicle, there may be a bypass opening that may be provided in the grille shutters. As the bypass opening is permanently open, it may impact an air flow distribution around the vehicle and subsequently affects aerodynamics of the vehicle.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to an embodiment of the disclosure, a system may be provided. The system may include a first flap coupled to a first portion of a duct associated with a heat exchanger of a vehicle. The first flap may be configured to form a first airflow path towards the heat exchanger. The system may further include a second flap coupled to a second portion of the duct associated with the heat exchanger of the vehicle. The second flap may be configured to form a second airflow path towards the heat exchanger. The first airflow path may be different from the second airflow path.

According to another embodiment of the disclosure, a control system may be provided. The control system may include circuitry. The circuitry may be configured to control a first flap, coupled to a first portion of a duct associated with a heat exchanger of a vehicle, to releasably open the first flap and form a first airflow path towards the heat exchanger. The circuitry may be further configured to control a second flap, coupled to a second portion of the duct associated with the heat exchanger of the vehicle, to releasably open the second flap and form a second airflow path towards the heat exchanger. The first airflow path may be different from the second airflow path.

According to another embodiment of the disclosure, a method is provided. The method may include controlling a first flap, coupled to a first portion of a duct associated with a heat exchanger of a vehicle, to releasably open the first flap and form a first airflow path towards the heat exchanger. The method may further include controlling a second flap, coupled to a second portion of the duct associated with the heat exchanger of the vehicle, to releasably open the second flap and form a second airflow path towards the heat exchanger. The first airflow path may be different from the second airflow path.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may be found in a system. The system may include a first flap (such as a first covering) coupled to a first portion (such as a primary grille) of a duct associated with a heat exchanger of a vehicle. The first flap may be configured to form a first airflow path towards components (such as an engine or a motor) associated with the heat exchanger. The system may further include a second flap (such as a second covering) coupled to a second portion (such as a supplementary grille) of the duct associated with the heat exchanger of the vehicle, to form a second airflow path towards the heat exchanger. The first airflow path may be different from the second airflow path. As the first airflow path and the second airflow path are different, the components of the vehicle may be configured to receive increased airflow from different directions and therefore, substantially improving cooling of the components of the vehicle.

In certain instances, the second flap may temporarily open to allow the airflow, via the supplementary grille, to cool the components of the vehicle. For example, if the first flap fails to open and blocks the airflow to the heat exchanger of the vehicle, the second flap may temporarily open to allow the airflow via the supplementary grille of the duct, to cool the components of the vehicle. In another example, if there is additional work done by the vehicle (such as an uphill movement of the vehicle, an air conditioning work in a cabin of the vehicle, or a fast charging of battery associated with the vehicle), there may be a significant increase in heat of components the vehicle. In such instances, the second flap may temporarily open to allow the airflow via the supplementary grille of the duct, to cool the components of the vehicle. As the supplementary grille is opened only on a temporary basis, an airflow distribution around the vehicle may not be affected and the aerodynamics of the vehicle shall be significantly improved.

Reference will now be made in detail to specific aspects or features, examples of which are illustrated in the accompanying drawings. Wherever possible, corresponding, or similar reference numbers will be used throughout the drawings to refer to the same or corresponding parts.

Figure 1A:
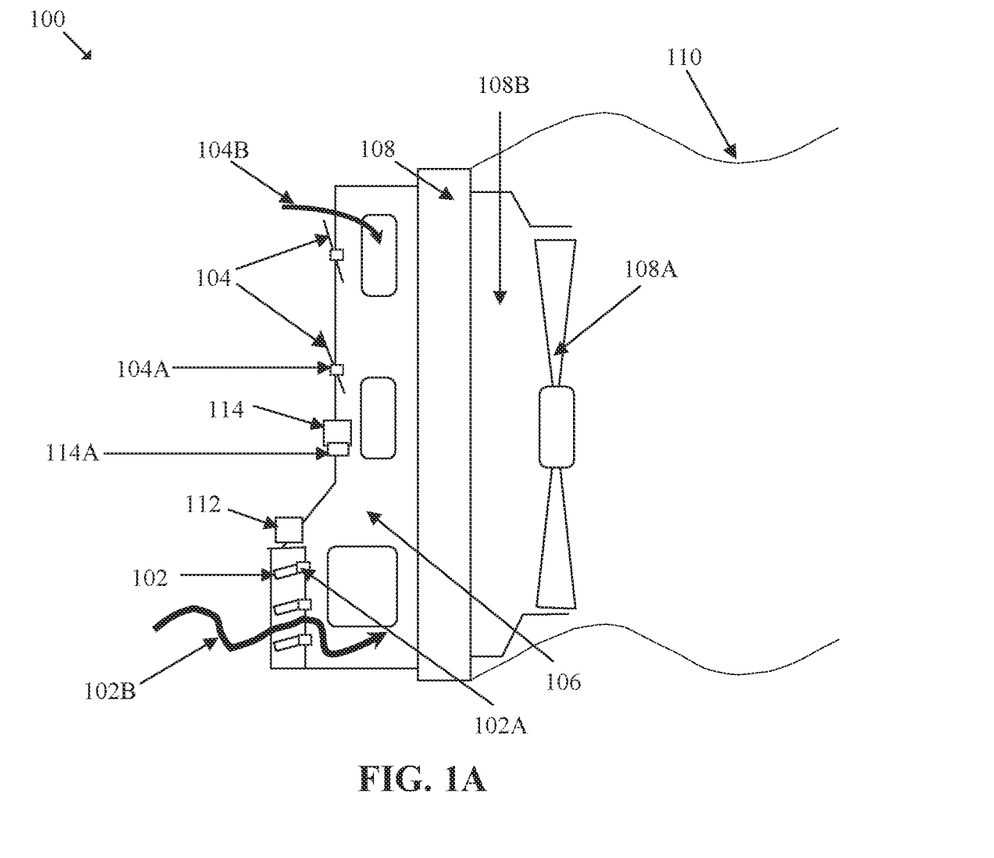
FIGS. 1A-1B are perspective views of a system assembled in an exemplary vehicle, in accordance with an embodiment of the disclosure.
Figure 1B:
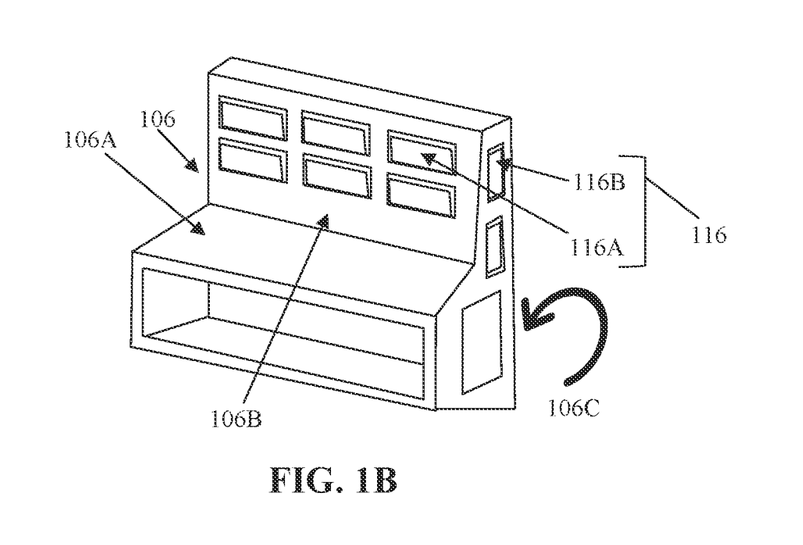

FIGS. 1A-1B are perspective views of a system assembled in an exemplary vehicle, in accordance with an embodiment of the disclosure. With reference to FIGS.

1A-1B, there is shown a system 100. The system 100 may include a first flap 102 and a second flap 104, which may be configured to conceal portions of a duct 106 associated with a heat exchanger 108 of a vehicle 110. The first flap 102 may be controlled by a first actuator 112 and the second flap 104 may be controlled by a second actuator 114. In an embodiment, in addition to the first flap 102 and the second flap 104, there may also be a plurality of flaps 116 (shown in FIG. 1B) that may be configured to conceal portions of the duct 106.

The first flap 102 may be coupled to a first portion 106A of the duct 106 associated with the heat exchanger 108 of the vehicle 110. In an embodiment, the first flap 102 may be a first covering that may be configured to releasably conceal the first portion 106A (for example, a slot) of the duct 106. In some instances, the first flap 102 may be coupled to the duct 106 via a first pivot element 102A associated with the first flap 102. The first pivot element 102A may be configured to movably pivot the first flap 102 to releasably open the first portion 106A of the duct 106 and form a first airflow path 102B towards the heat exchanger 108.

In an embodiment, the first pivot element 102A may include one of: an edge hinge located at an edge of the first flap 102, a mid-hinge located at a mid-portion of the first flap 102, a living hinge integrally formed in the first flap 102, or a dual hinge disposed on opposing ends of the first flap 102. In an example, the first pivot element 102A may be disposed at an edge of the first portion 106A of the duct 106 to form the edge hinge and configured to control a movement of the first flap 102 along an axis of the edge hinge.

In another example, the first pivot element 102A may be formed at a portion (such as the mid-portion) of the first flap 102, which allows the first flap 102 to form at least two sub-sections, such as, a first sub-section (not shown) and a second sub-section (not shown). The first sub-section may be integrally coupled to the first portion 106A of the duct 106, and the second sub-section is configured to move along an axis of the first pivot element 102A. The second sub-section may be disposed at an edge of the first sub-section (for example, the mid-portion of the first flap 102). The first pivot element 102A may be disposed at the edge of the first sub-section and may connect the second sub-section of the first flap 102, so that, the second sub-section may be configured to move along an axis of the first pivot element 102A.

In yet another example, the first pivot element 102A may be formed from a material, which is same as a material of the first flap 102 and configured to be integrally coupled to the first flap 102, as the living hinge. Such living hinge may allow the movement of the first flap 102 along an axis of the living hinge. In yet another example, the first flap 102 may have opposing ends that may be coupled to opposing edges of the first portion 106A of the duct 106. In such instances, the first flap 102 may be split in two-halves and each halve may be pivoted along opposing edges to control the movement of the first flap 102. Based on the movement of the first flap 102, the system 100 may allow the airflow towards the heat exchanger 108 and may form the first airflow path 102B towards the heat exchanger 108, to cool the components (such as engines, motors, etc.) of the vehicle 110.

In an embodiment, the first flap 102 may be located at the first portion 106A (such as the primary grille) of the duct 106. The first flap 102 may act as an active grille shutter for the duct 106 and may control the airflow towards the heat exchanger 108. In certain instances, the first flap 102 may actively open to control the airflow towards the heat exchanger 108. For example, when the vehicle is started, there may be a generation of heat from the components (such as the engine or the motor) of the vehicle 110. Based on the generation of the heat, the first flap 102 may actively open to allow the airflow towards the heat exchanger 108, along the first airflow path 102B, to cool the components of the vehicle 110. In an embodiment, the first flap 102 may be coupled to the first portion 106A that may be located at a proximal end of the duct 106, which is located at a first distance (not shown) from the heat exchanger 108. For example, the first flap 102 may include, but not limited to, a cover, a baffle, a lid, and the like.

In an embodiment, the first flap 102 may have a substantially rectangular shape, which may be configured to conceal the first portion 106A of the duct 106. The first flap 102 may also have other shapes, to conceal the first portion 106A of the duct 106. For example, the first flap 102 may have one of: a substantially square shape, a substantially circular shape, or a substantially polygonal shape, to conceal the first portion 106A of the duct 106. In another embodiment, the shape of the first flap 102 may be formed based on a shape of the first portion 106A of the duct 106. For example, if the first portion 106A has a substantially rectangular shape, the first flap 102 may also have the substantially rectangular shape to align with the first portion 106A and releasably close the first portion 106A of the duct 106. In another example, if the first portion 106A has a substantially polygonal shape, the first flap 102 may also have the substantially polygonal shape to align with the first portion 106A and releasably close the first portion 106A of the duct 106. Such conformity of shapes between the first flap 102 and the first portion 106A may facilitate an effective control of the airflow along the first airflow path 102B. In addition to the first flap 102, the system 100 may also control the second flap 104.

The second flap 104 may be coupled to a second portion 106B (shown in FIG. 1B) of the duct 106 associated with the heat exchanger 108 of the vehicle 110. In an embodiment, the second flap 104 may be a second covering that may be configured to releasably conceal the second portion 106B (for example, a slot) of the duct 106. In some instances, the second flap 104 may be coupled to the duct 106 via a second pivot element 104A associated with the second flap 104. The second pivot element 104A may be configured to movably pivot the second flap 104 to releasably open the second portion 106B of the duct 106 and form a second airflow path 104B towards the heat exchanger 108.

In an embodiment, the second pivot element 104A may include one of: an edge hinge located at an edge of the second flap 104, a mid-hinge located at a mid-portion of the second flap 104, a living hinge integrally formed in the second flap 104, or a dual hinge disposed on opposing ends of the second flap 104. In an example, the second pivot element 104A may be disposed at an edge of the second portion 106B of the duct 106 to form the edge hinge and configured to control a movement of the second flap 104 along an axis of the edge hinge.

In another example, the second pivot element 104A may be formed at a portion (such as the mid-portion) of the second flap 104, which may allow the second flap 104 to form at least two sub-sections, such as, a first sub-section (not shown) and a second sub-section (not shown). The first sub-section may be integrally coupled to the second portion 106B of the duct 106, and the second sub-section is configured to move along an axis of the second pivot element 104A. The second sub-section may be disposed at an edge of the first sub-section (for example, the mid-portion of the second flap 104). The second pivot element 104A may be disposed at the edge of the first sub-section and connects the second sub-section of the second flap 104, so that, the second sub-section may be configured to move along an axis of the second pivot element 104A.

In yet another example, the second pivot element 104A may be formed from a material, which is same as a material of the second flap 104 and configured to be integrally coupled to the second flap 104, as the living hinge. Such living hinge may allow the movement of the second flap 104 along an axis of the living hinge. In yet another example, the second flap 104 may have opposing ends that may be coupled to opposing edges of the second portion 106B of the duct 106. In such instances, the second flap 104 may be split in two-halves and each halve may be pivoted along opposing edges to control the movement of the second flap 104. Based on the movement of the second flap 104, the system 100 may allow the airflow towards the heat exchanger 108 and may form the second airflow path 104B towards the heat exchanger 108, to cool the components (such as engines, motors, etc.) of the vehicle 110.

In an embodiment, the second flap 104 may be located at the second portion 106B (such as the secondary grille) of the duct 106. The second flap 104 may act as a passive grille shutter for the duct 106 and controls the airflow towards the heat exchanger 108. In certain instances, the second flap 104 may be configured to open, to control the airflow towards the heat exchanger 108. In an embodiment, based on certain instances, the second flap 104 may be automatically opened to control the airflow towards the heat exchanger 108. In another embodiment, based on certain instances, the second flap 104 may be manually opened to control the airflow towards the heat exchanger 108.

For example, if the first flap 102 fails to open and blocks the airflow to the heat exchanger 108 of the vehicle 110, the second flap 104 may temporarily open to allow the airflow via the supplementary grille (i.e., the second portion 106B) of the duct 106, to cool the components (such as, the engines or the motors) of the vehicle 110. In another example, if there is additional work done by the vehicle 110 (such as an uphill movement of the vehicle 110, an air conditioning work in a cabin of the vehicle 110, or a fast charging of battery associated with the vehicle 110), there may be a significant increase in heat of components the vehicle 110. In such instances, the second flap 104 may temporarily open to allow the airflow via the supplementary grille (i.e., the second portion 106B) of the duct 106, to cool the components of the vehicle 110. As the supplementary grille is opened only on a temporary basis, an airflow distribution around the vehicle 110 may not be affected and the aerodynamics of the vehicle 110 shall be significantly improved.

In an embodiment, the second flap 104 may be coupled to the second portion 106B that may be located at a distal end of the duct 106, which is located at a second distance (not shown) from the heat exchanger 108. In an example, the second distance of the second flap 104 may be shorter than the first distance of the first flap 102, from the heat exchanger 108. In another example, the second distance of the second flap 104 may be larger than the first distance of the first flap 102, from the heat exchanger 108. In yet another example, the second distance of the second flap 104 may be equal to the first distance of the first flap 102, from the heat exchanger 108.

In another embodiment, the second flap 104 may have a substantially rectangular shape, which may be configured to conceal the second portion 106B of the duct 106. The second flap 104 may also have other shapes, to conceal the second portion 106B of the duct 106. For example, the second flap 104 may have one of: a substantially square shape, a substantially circular shape, or a substantially polygonal shape, to conceal the second portion 106B of the duct 106. In another embodiment, the shape of the second flap 104 may be formed based on a shape of the second portion 106B of the duct 106. For example, if the second portion 106B has a substantially rectangular shape, the second flap 104 may also have the substantially rectangular shape to align with the second portion 106B and releasably close the second portion 106B of the duct 106. In another example, if the second portion 106B has a substantially polygonal shape, the second flap 104 may also have the substantially polygonal shape to align with the second portion 106B and releasably close the second portion 106B of the duct 106. Such conformity of shapes between the second flap 104 and the second portion 106B may facilitate an effective control of the airflow along the second airflow path 104B. The second flap 104 may include, but not limited to, a cover, a baffle, a lid, and the like, which may be configured to conceal the second portion 106B of the duct 106.

In yet another embodiment, the first airflow path 102B via the first flap 102 may be different from the second airflow path 104B via the second flap 104. In an example, the first airflow path 102B may be configured to allow the airflow along a horizontal direction. In another example, the second airflow path 104B may be configured to allow the airflow along a vertical direction. In yet another example, the first airflow path 102B may be disposed at an angle, which may be different from an angle of the second airflow path 104B. In another embodiment, the first airflow path 102B may be formed in a plane (not shown) that may be substantially perpendicular to a plane (not shown) of the second airflow path 104B. For example, the first airflow path 102B may be disposed at a first plane that is in a substantially horizontal direction. In another example, the second airflow path 104B may be disposed at a second plane that is in a substantially vertical direction. The first plane may be disposed substantially perpendicular to the second plane, so that, there may be an increased airflow towards the heat exchanger 108 and thereby, improving cooling of the components (such as the engine or the motor) of the vehicle 110, via the duct 106 that directs the airflow towards the heat exchanger 108.

The duct 106 may be configured to receive the airflow from the environment and allow the received airflow towards the heat exchanger 108 of the vehicle 110, to cool the components (such as the engine or the motor) of the vehicle 110. In an embodiment, the duct 106 may include a cavity to receive the airflow from the environment and direct the received airflow towards the heat exchanger 108. In another embodiment, the duct 106 may have a plurality of openings (for example, at the first portion 106A or at the second portion 106B) to receive the airflow in the cavity of the duct 106 and then, transfer the received airflow towards the heat exchanger, via a suitable airflow path (such as the first airflow path 102B or the second airflow path 104B). In yet another embodiment, the plurality of openings is arranged in an array to effectively receive the airflow from the environment. For example, a first set of the plurality of openings may be arranged as a first array in a first plane of the duct 106 and a second set of the plurality of openings may be arranged as a second array in a second plane of the duct 106. In an embodiment, the first array may be substantially perpendicular to the second array. In another embodiment, the first array may be substantially parallel to the second array.

In an embodiment, certain portions (such as the first portion 106A or the second portion 106B) of the duct 106 may be concealed by the plurality of flaps 116 (shown in FIG. 1B). In an embodiment, the plurality of flaps 116 may be disposed in the second portion 106B of the duct 106. The plurality of flaps 116 may be configured to cover the plurality of openings in corresponding portions (such as the second portion 106B) of the duct 106.

In an example, as shown in FIG. 1B, a first set 116A of the plurality of flaps 116 are disposed on a first plane (not shown) of the second portion 106B of the duct 106. The first set 116A of the plurality of flaps 116 may be configured to cover the first set of the plurality of openings of the duct 106, which may be arranged as the first array in the first plane of the duct 106. In an embodiment, the first plane of the second portion 106B may be aligned with the first plane of the duct 106, such that, the first set 116A of the plurality of flaps 116 in the first plane of the second portion 106B may be aligned and mate with the first set of the plurality of openings in the first plane of the duct 106.

In another example, a second set 116B of the plurality of flaps 116 are disposed on a second plane of the second portion 106B. The second set 116B of the plurality of flaps 116 may be configured to cover the second set of the plurality of openings of the duct 106, which may be arranged as the second array in the second plane of the duct 106. In an embodiment, the second plane of the second portion 106B may be aligned with the second plane of the duct 106, such that, the second set 116B of the plurality of flaps 116 in the second plane of the second portion 106B may be aligned and mate with the second set of the plurality of openings in the second plane of the duct 106.

In an embodiment, the first set 116A of the plurality of flaps 116 may be located substantially perpendicular to the second set 116B of the plurality of flaps 116. For example, the first set 116A of the plurality of flaps 116 disposed in the first plane of the second portion 106B may be located substantially perpendicular to the second set 116B of the plurality of flaps 116 disposed in the second plane of the second portion 106B, to facilitate a cross airflow via the first set and the second set of the plurality of openings of the duct 106. Therefore, the first plane of the second portion 106B may be located substantially perpendicular to the second plane of the second portion 106B, to facilitate the cross airflow and improve cooling of the components of the vehicle 110. In another example, the first plane of the second portion 106B may be located substantially parallel to the second plane of the second portion 106B. In yet another example, the first plane of the second portion 106B may be located at an inclined angle from the second plane of the second portion 106B. Based on user requirements and corresponding alignment of the first plane and the second plane of the second portion 106B, the plurality of flaps 116 may accordingly align and mate with the plurality of openings of the duct 106.

In another embodiment, the first set 116A of the plurality of flaps 116 may be selectively controlled to form a first air flow towards the heat exchanger 108. For example, the first set 116A of the plurality of flaps 116 may be selectively opened to allow the first air flow, via the first set of the plurality of openings in the duct 106, towards the heat exchanger 108, to cool the components (such as the engine or the motor) of the vehicle 110. The second set 116B of the plurality of flaps 116 may be selectively controlled to form a second air flow towards the heat exchanger 108, to cool the components of the vehicle 110. For example, the second set 116B of the plurality of flaps 116 may be selectively opened to allow the second air flow, via the second set of the plurality of openings in the duct 106, towards the heat exchanger 108, to cool the components (such as the engine or the motor) of the vehicle 110.

In an embodiment, the first air flow may be directed in a horizontal direction that is substantially parallel to an axis of the heat exchanger 108. In another embodiment, the second air flow may be directed in a substantially vertical direction that is substantially perpendicular to the axis of the heat exchanger 108. Therefore, it may be observed that the first airflow path formed in a plane that may be substantially perpendicular to a plane of the second airflow path, and such configuration forms the cross airflow between the first airflow path and the second airflow path. The cross airflow may further improve cooling of the components of the vehicle 110.

In certain instances, the first air flow may be formed as a substantially uniform airflow, via the first set 116A of the plurality of flaps 116, as compared to the second air flow, which may be formed via the second set 116B of the plurality of flaps 116. Therefore, the cooling that may be obtained from the first air flow may be substantially consistent, as compared to the cooling of the second air flow. Hence, there may be an increase in a count of the first set 116A of the plurality of flaps 116 and corresponding first set of the plurality of openings of the duct 106, as compared to a count of the second set 116B of the plurality of flaps 116 and corresponding second set of the plurality of openings of the duct 106, to facilitate improved uniform cooling of the components of the vehicle 110.

In an embodiment, the duct 106 may be formed as a substantially L-shaped structure, which may be configured to effectively receive the airflow from the environment. For example, the duct 106 may include the first portion 106A and the second portion 106B, which may collectively form the substantially L-shaped structure. The first portion 106A may form a horizontal base (not shown) of the L-shaped structure and the second portion 106B may form a vertical extension (not shown) from an end of the base to form the substantially L-shaped structure. The duct 106 shown in FIGS. 1A and 1B is merely an example, and the duct 106 may have any structure. Examples of the structure may include, but not limited to, a substantially C-shaped structure, a substantially U-shaped structure, a substantially T-shaped structure, and the like.

In an embodiment, the first portion 106A of the duct 106 may be different from the second portion 106B of the duct 106. For example, the first portion 106A may include a plurality of openings that may be different from the plurality of openings of the second portion 106B. The plurality of openings of the first portion 106A may be disposed at the first distance from the heat exchanger 108 and the plurality of openings of the second portion 106B may be disposed at the second distance from the heat exchanger 108. In an example, the second distance of the second portion 106B may be shorter than the first distance of the first portion 106A, from the heat exchanger 108. In another example, the second distance of the second portion 106B may be larger than the first distance of the first portion 106A, from the heat exchanger 108. In yet another example, the second distance of the second portion 106B may be equal to the first distance of the first portion 106A, from the heat exchanger 108.

In another embodiment, the first portion 106A may be a slot in the duct 106 that may be determined based on a layout (not shown) of the vehicle 110, and the first flap 102 may be coupled to the slot of the duct 106, based on the layout of the vehicle 110. For example, the first portion 106A may be an opening form the plurality of openings of the duct 106, and such opening may be determined based on the layout (such as, a sedan, a hatchback, etc.) of a body-in-white of the vehicle 110. Based on the determination of the layout and the corresponding location of the first portion 106A, the first flap 102 may be correspondingly aligned and coupled to the first portion 106A, to releasably control the airflow along the first airflow path 102B, towards the heat exchanger 108, to cool the components of the vehicle 110.

In yet another embodiment, the second portion 106B may be a slot in the duct 106 that may be determined based on the layout of the vehicle 110, and the second flap 104 may be coupled to the slot of the duct 106, based on the layout of the vehicle. For example, the second portion 106B may be an opening form the plurality of openings of the duct 106, and such opening may be determined based on the layout (such as, the sedan, the hatchback, etc.) of the body-in-white of the vehicle 110. Based on the determination of the layout and the corresponding location of the second portion 106B, the second flap 104 may be correspondingly aligned and coupled to the second portion 106B, to releasably control the airflow along the second airflow path 104B, towards the heat exchanger 108, to cool the components of the vehicle 110.

The heat exchanger 108 may include a suitable design to transfer the heat from the components (such as the engine or the motor) of the vehicle 110 to the environment of the vehicle 110, via a medium of fluid (such as the airflow) around components of the vehicle 110. In certain instances, the medium of fluid may be one of: a parallel flow fluid, a counter flow fluid, or a cross flow fluid. In other instances, the heat exchanger 108 may include a radiator 108A. The radiator 108A may include a fan that may be configured to receive the airflow from the environment, via one of: the first flap 102 or the second flap 104. Based on the reception of the airflow, the radiator 108A of the heat exchanger 108 may transfer the received airflow, to cool the components of the vehicle 110.

In an embodiment, the radiator 108A of the heat exchanger 108 may be disposed in a first region 108B associated with the heat exchanger 108. In an example, the first region 108B may be a space between the radiator 108A and the heat exchanger 108 of the vehicle 110. In another embodiment, the heat exchanger 108 may be coupled with the duct 106 to form a second region 106C. In an example, the second region 106C may be a space between the flaps (such as the first flap 102 or the second flap 104) that may be coupled to the portions (such as the first portion 106A or the second portion 106B) of the duct 106 and the heat exchanger 108 of the vehicle 110.

The vehicle 110 may include a non-autonomous vehicle, a semi-autonomous vehicle, or a fully autonomous vehicle, for example, as defined by National Highway Traffic Safety Administration (NHTSA). In some situations, the vehicle 110 may also include a vehicle with autonomous drive capability that uses one or more distinct renewable or non-renewable power sources, such as, a fossil fuel-based vehicle, an electric propulsion-based vehicle, a hydrogen fuel-based vehicle, a solar-powered vehicle, and/or a vehicle powered by other forms of alternative energy sources. Examples of such vehicles may include, but are not limited to, an electric vehicle, an internal combustion engine (ICE)-based vehicle, or a hybrid vehicle. The vehicle 110 shown in FIG. 1 is merely an example. Examples of the vehicle 110 may include, but not limited to, a one-wheeler vehicle, a two-wheeler vehicle, a three-wheeler vehicle, a four-wheeler vehicle, or a multi-wheeler vehicle (such as a lorry, a truck, etc.).

In an embodiment, the first flap 102 of the system 100 may be configured to selectively open the first portion 106A of the duct 106, based on an actuation of a first actuator 112. For example, the first flap 102 may be coupled to the first portion 106A of the duct 106, via the first actuator 112. Based on the actuation of the first actuator 112, the first flap 102 may releasably close the first portion 106A of the duct 106, to allow the airflow, via the first airflow path, towards the heat exchanger 108.

The first actuator 112 may include one of: an electronic actuator, an electro-mechanical actuator, a pneumatic actuator, a magnetic actuator, or a hydraulic actuator. For example, the first actuator 112 may include one of: a stepper motor, a solenoid, an air cylinder, a hydraulic cylinder, and the like. The first actuator 112 may be coupled to a portion of the first flap 102 coupled to the first portion 106A of the duct 106, to selectively open the first portion 106A of the duct 106.

In certain instances, the first actuator 112 may be automatically activated to selectively open the first portion 106A of the duct 106. For example, when the components of the vehicle 110 is heated, the first actuator 112 may be automatically activated to selectively open the first portion 106A of the duct 106. In other instances, the first actuator 112 may be manually activated to selectively open the first portion 106A of the duct 106. For example, when the components of the vehicle 110 is heated and if the first flap 102 is failed to open, the first actuator 112 may manually open the first flap 102, to cool the components of the vehicle 110. In an embodiment, the first actuator 112 may be activated based on a manual operation on one of: the electronic actuator, the electro-mechanical actuator, the pneumatic actuator, the magnetic actuator, or the hydraulic actuator. For example, at least one of: the stepper motor, the solenoid, the air cylinder, the hydraulic cylinder, and the like, may be manually activated, to control the movement of the first flap 102.

The second actuator 114 may include one of: an electronic actuator, an electro-mechanical actuator, a pneumatic actuator, a magnetic actuator, or a hydraulic actuator. For example, the second actuator 114 may include one of: a stepper motor, a solenoid, an air cylinder, a hydraulic cylinder, and the like. The second actuator 114 may be coupled to a portion of the second flap 104 coupled to the second portion 106B of the duct 106, to selectively open the second portion 106B of the duct 106.

In certain instances, the second actuator 114 may be automatically activated to selectively open the second portion 106B of the duct 106. For example, when the first flap 102 is failed to open or when the components of the vehicle 110 is over heated, the second actuator 114 may be automatically activated to selectively open the second portion 106B of the duct 106. In other instances, the second actuator 114 may be manually activated to selectively open the second portion 106B of the duct 106. For example, when the components of the vehicle 110 is over heated and if the first flap 102 is failed to open and if the second flap 104 does not automatically open, the second actuator 114 may manually open the second flap 104, to cool the components of the vehicle 110. In an embodiment, the second actuator 114 may be activated based on a manual operation on one of: the electronic actuator, the electro-mechanical actuator, the pneumatic actuator, the magnetic actuator, or the hydraulic actuator. For example, at least one of: the stepper motor, the solenoid, the air cylinder, the hydraulic cylinder, and the like, may be manually activated, to control the movement of the second flap 104.

In another embodiment, the second actuator 114 may include a flow control valve 114A. The flow control valve 114A may control the activation of the second flap 104 based on a parameter associated with the vehicle 110. In an example, the second actuator 114 may include the flow control valve 114A that may be activated based on one of: a pressure difference or a gravity difference, between the first region 108B associated with the radiator 108A of the heat exchanger 108 and the second region 106C associated with the second portion 106B of the duct 106. The flow control valve 114A may determine the pressure difference or the gravity difference, between the first region 108B and the second region 106C, and accordingly control the flaps (such as, the first flap 102 or the second flap 104) coupled to the portions (such, the first portion 106A or the second portion 106B) of the duct 106, to facilitate cooling of the components of the vehicle 110. For example, based on a negative pressure formed in the first region 108B, the system 100 may open the flaps (such as the first flap 102 or the second flap 104) to receive the airflow along one of: the first airflow path 102B or the second airflow path 104B, towards the heat exchanger 108, and cool the components of the vehicle 110.

In operation, based on the heat generated from the components (such as the engine or the motor) of the vehicle 110, the system 100 may selectively open the first flap 102 associated with the first portion 106A (i.e., the primary grille) to allow the airflow along the first airflow path 102B, towards the heat exchanger 108, to cool the components of the vehicle 110. The system 100 may also selectively open the second flap 104 associated with the second portion 106B to allow the airflow along the second airflow path 104B, to further cool the components of the vehicle 110. As the first airflow path 102B and the second airflow path 104B is different, the components of the vehicle 110 may be configured to receive increased airflow from different directions and therefore, substantially improving cooling of the components of the vehicle 110.

In certain instances, the second flap 104 may temporarily open to allow the airflow, via the second portion 106B (i.e., the supplementary grille), to cool the components of the vehicle 110. For example, if the first flap 102 fails to open and blocks the airflow to the heat exchanger 108 of the vehicle 110, the second flap 104 may temporarily open to allow the airflow, via the supplementary grille of the duct 106, to cool the components of the vehicle 110. Details of the failure of the first flap 102 is further described, for example, in FIG. 3. In another example, if there is additional work done by the vehicle 110 (such as an uphill movement of the vehicle 110, an air conditioning work in a cabin of the vehicle 110, or a fast charging of battery associated with the vehicle 110), there may be a significant increase in heat of components the vehicle 110. In such instances, the second flap 104 may temporarily open to allow the airflow, via the supplementary grille of the duct 106, to cool the components of the vehicle 110. As the supplementary grille is opened only on a temporary basis, an airflow distribution around the vehicle 110 may not be affected and the aerodynamics of the vehicle 110 shall be significantly improved.

Figure 2:
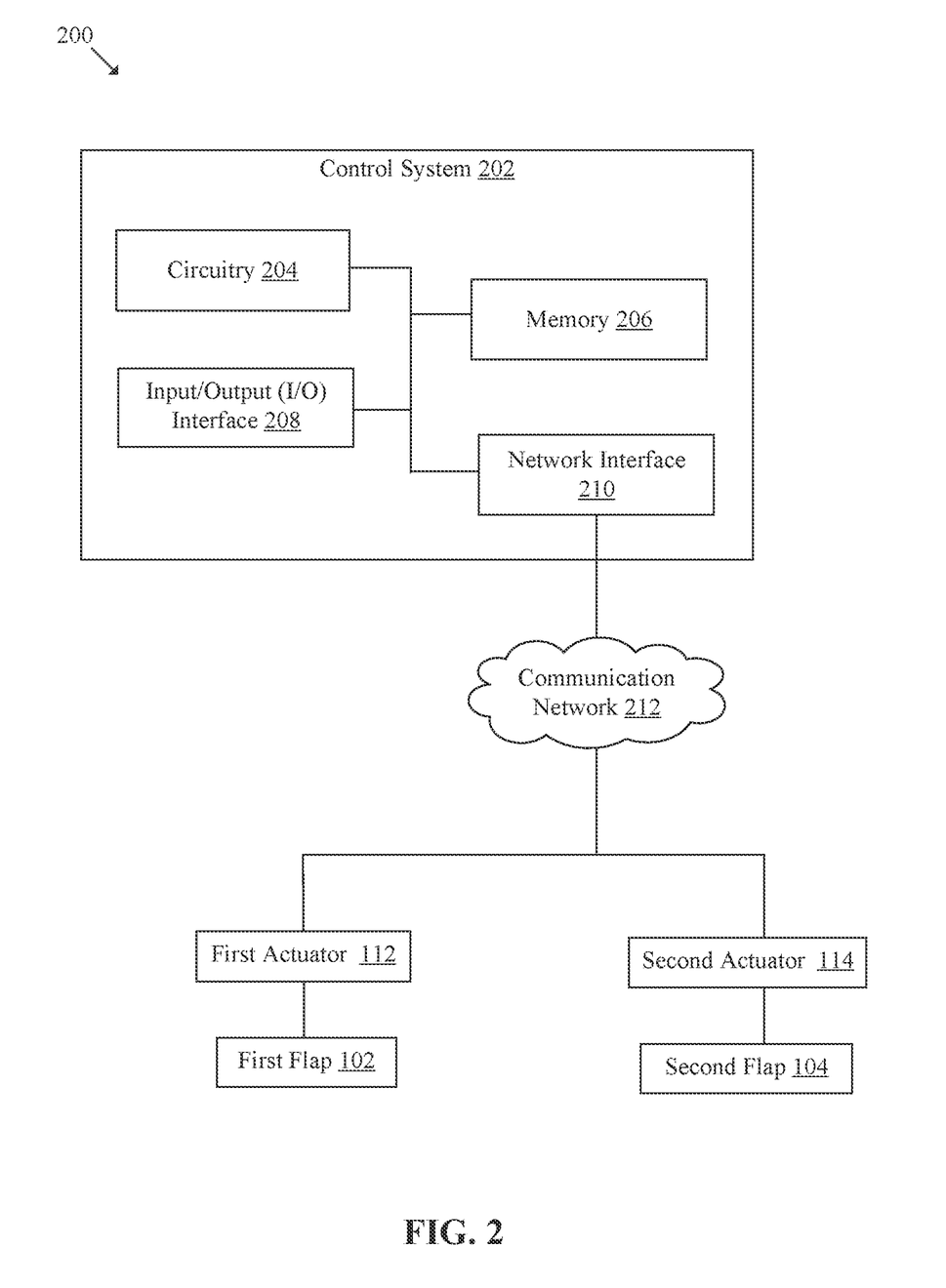
FIG. 2 is a block diagram of a control system assembled in an exemplary vehicle, in accordance with an embodiment of the disclosure.

FIG. 2 is a block diagram of a control system assembled in an exemplary vehicle, in accordance with an embodiment of the disclosure. FIG. 2 is explained in conjunction with elements from FIGS. 1A and 1B. With reference to FIG. 2, there is shown a block diagram 200 of a control system 202. The control system 202 may include circuitry 204, a memory 206, an Input/Output (I/O) interface 208, and a network interface 210. In an embodiment, the network interface 210 of the control system 202 may be communicatively coupled to the first flap 102 and the second flap 104, via a communication network 212.

The circuitry 204 may include suitable logic, circuitry, and/or interfaces code that may be configured to execute program instructions associated with different operations to be executed by the control system 202 or the system 100. For example, some of the operations may include: control of the first flap 102 (i.e, coupled to the first portion 106A of the duct 106 associated with the heat exchanger 108 of the vehicle 110, to releasably open the first flap 102 and form the first airflow path 102B towards the heat exchanger 108 to cool components of the vehicle 110), and control of the second flap 104 (i.e, coupled to the second portion 106B of the duct 106 associated with the heat exchanger 108 of the vehicle 110, to releasably open the second flap 104 and form the second airflow path 104B towards the heat exchanger 108 to further cool components of the vehicle 110).

The circuitry 204 may include any suitable special-purpose or general-purpose computer, computing entity, or processing device including various computer hardware or software modules and may be configured to execute instructions stored on any applicable computer-readable storage media. For example, the circuitry 204 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. The circuitry 204 may include any number of processors configured to, individually or collectively, perform or direct performance of any number of operations of the control system 202 or the system 100, as described in the present disclosure. Examples of the processor may include a Central Processing Unit (CPU), a Graphical Processing Unit (GPU), an x86-based processor, an x64-based processor, a Reduced Instruction Set Computing (RISC) processor, a Complex Instruction Set Computing (CISC) processor, and/or other hardware processors.

The memory 206 may include suitable logic, circuitry, interfaces, and/or code that may be configured to store the program instructions executable by the circuitry 204. In at least one embodiment, the memory 206 may be further configured to store control instructions for the first actuator 112 to control the first flap 102 for releasably closing the first portion 106A of the duct 106 and directing the airflow towards the heat exchanger 108, via the first airflow path 102B. The memory 206 may be further configured to store control instructions for the second actuator 114 to control the second flap 104 for releasably closing the second portion 106B of the duct 106 and further directing the airflow towards the heat exchanger 108, via the second airflow path 104B. Example implementations of the memory 206 may include, but are not limited to, Random Access Memory (RAM), Read Only Memory (ROM), Hard Disk Drive (HDD), a Solid-State Drive (SSD), a CPU cache, and/or a Secure Digital (SD) card.

The I/O interface 208 may include suitable logic, circuitry, interfaces, and/or code that may be configured to receive an input and provide an output based on the received input from at least one of: the system 100, the control system 202, or an operator (not shown) associated with the vehicle 110. The I/O interface 208 may include one or more input and output devices that may communicate with different components of the system 100. For example, the I/O interface 208 may receive user inputs, via a touchscreen of at least one of: the system 100, the control system 202, or an operator device (such as a mobile phone) associated with the operator of the vehicle 110, to trigger execution of the program instructions associated with different operations executed by the control system 202. In an embodiment, the I/O interface 208 may be communicably coupled to the operator device (not shown), via the communication network 212. In another embodiment, the I/O interface 208 may integrally include the operator device. Examples of the I/O interface 208 may include, but are not limited to, a touchscreen, a keyboard, a mouse, a joystick, a microphone, a display device, or a speaker.

The network interface 210 may include suitable logic, circuitry, and interfaces that may be configured to facilitate communication between the control system 202, the first flap 102, the second flap 104, the first actuator 112, and the second actuator 114, via the communication network 212. The network interface 210 may be implemented by use of various known technologies to support wired or wireless communication of the control system 202 with the communication network 212. The network interface 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 210 may be configured to communicate via wireless communication with networks, such as the Internet, an Intranet, or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), $5^{th}$ Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a near field communication protocol, a wireless pear-to-pear protocol, a protocol for email, instant messaging, and a Short Message Service (SMS).

The communication network 212 may include a communication medium through which the system 100, the control system 202, the first flap 102, the second flap 104, the first actuator 112, and the second actuator 114, may communicate with each other. The communication network 212 may include one of: a wired connection or a wireless connection. Examples of the communication network 212 may include, but are not limited to, the Internet, a cloud network, a Cellular or Wireless Mobile Network (such as a Long-Term Evolution and 5G New Radio), a Wireless Fidelity (Wi-Fi) network, a Personal Area Network (PAN), a Local Area Network (LAN), or a Metropolitan Area Network (MAN). Various devices of the system 100 may be configured to connect to the communication network 212 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In an embodiment, the communication network 212 may be an in-vehicle network that may include a medium through which the various control units, components, and/or systems, for example, the first actuator 112 associated with the first flap 102 or the second actuator 114 associated with the second flap 104 may communicate with the control system 202. In accordance with an embodiment, in-vehicle communication of audio/video data may occur by use of Media Oriented Systems Transport (MOST) multimedia network protocol of the in-vehicle network or other suitable network protocols for vehicle communication. The in-vehicle network may facilitate access control and/or communication between the circuitry 204 and other ECUs, such as ECM or a telematics control unit (TCU) of the vehicle 110.

Various devices or components in the vehicle 110 may connect to the communication network 212 (such as, the in-vehicle network), in accordance with various wired and wireless communication protocols. Examples of the wired and wireless communication protocols for the in-vehicle network may include, but are not limited to, a vehicle area network (VAN), a controller area network (CAN) bus, a Domestic Digital Bus (D2B), Time-Triggered Protocol (TTP), FlexRay, IEEE 1394, Carrier Sense Multiple Access With Collision Detection (CSMA/CD) based data communication protocol, Inter-Integrated Circuit ($I^2C$), Inter Equipment Bus (IEBus), Society of Automotive Engineers (SAE) J1708, SAE J1939, International Organization for Standardization (ISO) 11992, ISO 11783, Media Oriented Systems Transport (MOST), MOST25, MOST50, MOST150, Plastic optical fiber (POF), Power-line communication (PLC), Serial Peripheral Interface (SPI) bus, and/or Local Interconnect Network (LIN).

In operation, the control system 202 may control the first flap 102, via the first actuator 112, to selectively open the first portion 106A of the duct 106 to allow the airflow via the first airflow path 102B. In an embodiment, the circuitry 204 of the control system 202 may control the first flap 102, coupled to the first portion 106A of the duct 106 associated with the heat exchanger 108 of the vehicle 110, to releasably open the first flap 102 and form the first airflow path 102B towards the heat exchanger 108. In an example, the control system 202 may be an electronic control unit (ECU) of the vehicle 110, which may control the first flap 102, via the first actuator 112, to selectively open the first portion 106A of the duct 106 to allow the airflow via the first airflow path 102B and cool the components (such as the engine or the motor) of the vehicle 110.

The control system 202 may further control the second flap 104, via the second actuator 114, to selectively open the second portion 106B of the duct 106 to allow the airflow via the second airflow path 104B. In an embodiment, the circuitry 204 of the control system 202 may control the second flap 104, coupled to the second portion 106B of the duct 106 associated with the heat exchanger 108 of the vehicle 110, to releasably open the second flap 104 and form the second airflow path 104B towards the heat exchanger 108, such that, the first airflow path 102B shall be different from the second airflow path 104B. In an example, the control system 202 may be the electronic control unit (ECU) of the vehicle 110, which may further control the second flap 104, via the second actuator 114, to selectively open the second portion 106B of the duct 106 to allow the airflow via the second airflow path 104B and further cool the components (such as the engine or the motor) of the vehicle 110.

Figure 3:
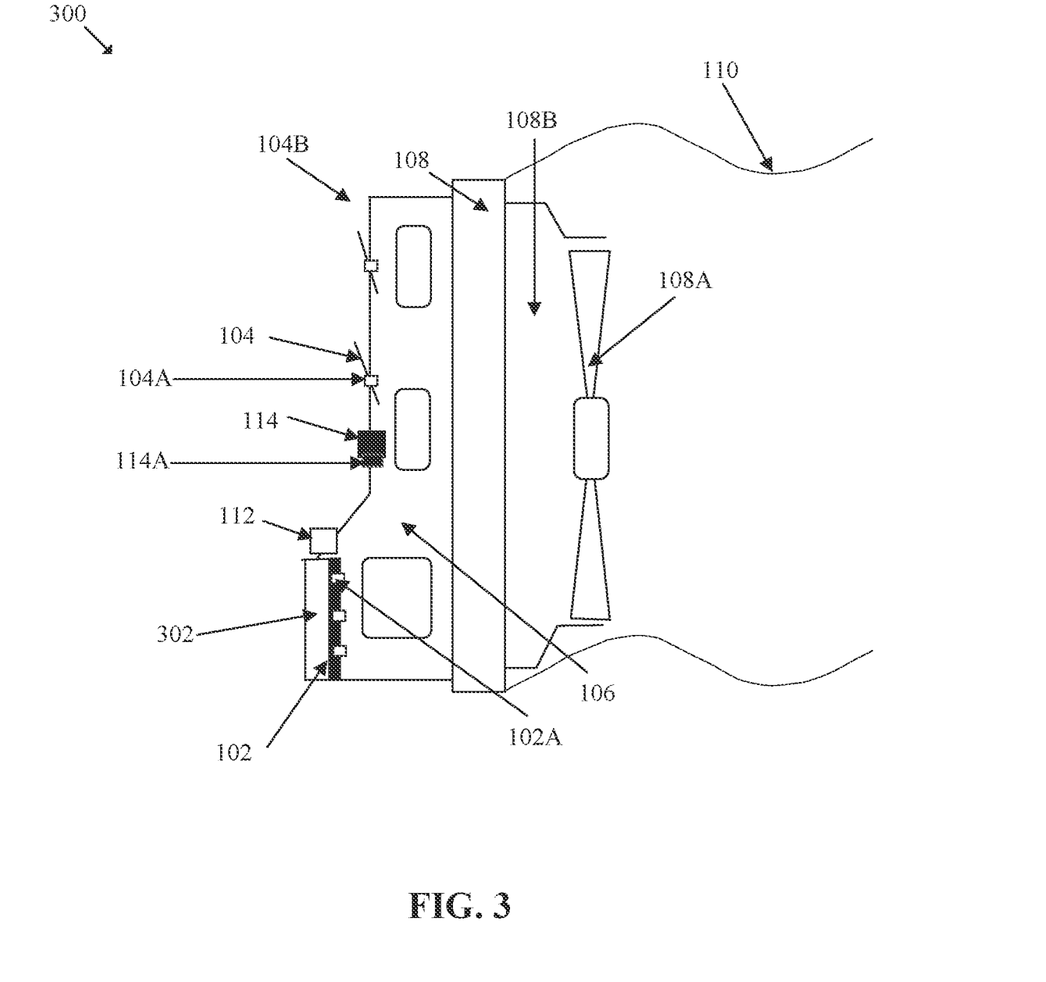
FIG. 3 is a first exemplary scenario of the system of FIG. 1, in accordance with an embodiment of the disclosure.

FIG. 3 is a first exemplary scenario of the system of FIG. 1, in accordance with an embodiment of the disclosure. FIG. 3 is explained in conjunction with elements from FIGS. 1A, 1B and 2. With reference to FIG. 3, there is shown a first exemplary scenario 300. The first exemplary scenario 300 may relate to a failure event 302 of the system 100.

In certain instances, the first flap 102 may fail to open and forms subsequent obstruction of the first airflow path 102B (shown in FIG. 1A), which may lead to the failure event 302. In an embodiment, based on a detection of the failure event 302, the second flap 104 may be activated based on one of: the pressure difference or the gravity difference, between the first region 108B associated with the radiator 108A of the heat exchanger 108 and the second region 106C (shown in FIG. 1B) associated with the second portion 106B of the duct 106, to form the second airflow path 104B. For example, based on the failure event 302, there may be a negative pressure that may be formed in the first region 108B. Due to such negative pressure of the first region 108B, the second actuator 114 may open the second flap 104 to receive the airflow along the second airflow path 104B, towards the heat exchanger 108, and cool the components of the vehicle 110.

In another embodiment, based on the detection of the failure event 302 of the first flap 102 and subsequent obstruction of the first airflow path 102B, the second actuator 114 may be activated based on the manual operation on one of: the electronic actuator, the electro-mechanical actuator, the pneumatic actuator, the magnetic actuator, or the hydraulic actuator, and the second flap 104 may be configured to selectively control the airflow in the second airflow path 104B, based on the activation of the second actuator 114. For example, when the components of the vehicle 110 is heated and if the first flap 102 is failed to open, the second actuator 114 may manually open the second flap 104, to receive the airflow along the second airflow path 104B, towards the heat exchanger 108, and cool the components of the vehicle 110.

Figure 4:
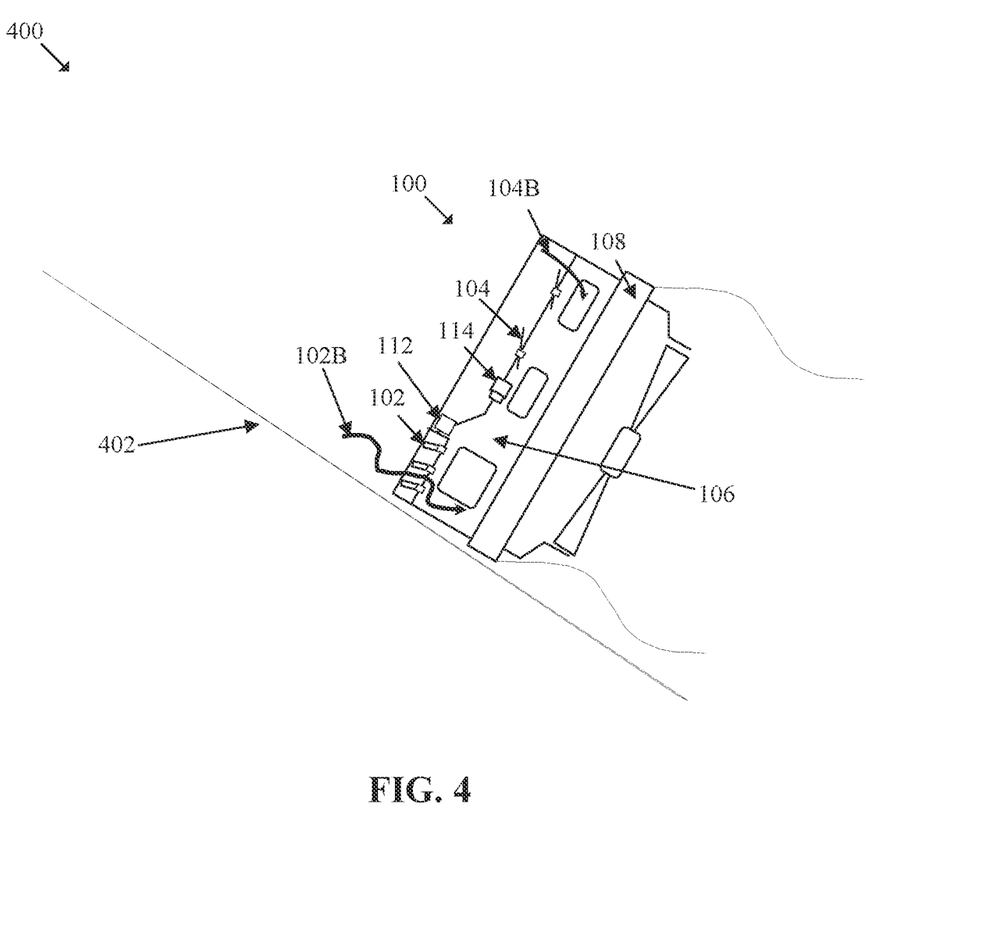
FIG. 4 is a second exemplary scenario of the system of FIG. 1, in accordance with an embodiment of the disclosure.

FIG. 4 is a second exemplary scenario of the system of FIG. 1, in accordance with an embodiment of the disclosure. FIG. 4 is explained in conjunction with elements from FIGS. 1A-1B, FIG. 2 and FIG. 3. With reference to FIG. 4, there is shown a second exemplary scenario 400. The second exemplary scenario 400 may relate to a loading event 402 of the system 100.

In certain instances, the components (such as the engine or the motor) of the vehicle 110 may be overloaded and may generate excessive heat. In an example, if the vehicle 110 is performing an uphill driving event where the vehicle 110 may be configured to drive in an inclined plane (such as a movement of the vehicle 110 in an uphill direction as shown in FIG. 4), there may be excessive generation of the heat from the components (such as the engine) of the vehicle 110. In another example, if the vehicle 110 quickly charges the battery associated with the motor of the vehicle 110, there may be excessive generation of the heat from the components (such as the battery) of the vehicle 110. In yet another example, if the vehicle 110 performs an air-cooling event where an air conditioner (not shown) associated with the vehicle 110 may be configured to cool a cabin (not shown) of the vehicle 110, there may be excessive generation of the heat from the components (such as the air conditioner) of the vehicle 110. Such instances may lead to the loading event 402.

In an embodiment, based on the detection of at least one event of: the fast-charging event where the battery associated with the vehicle 110 is charged, the uphill driving event where the vehicle 110 is configured to drive in the inclined plane, or the air-cooling event where the air conditioner associated with the vehicle 110 is configured to cool the vehicle 110, such as, based on the detection of the loading event 402, the second flap 104 may be activated based on one of: the pressure difference or the gravity difference, between the first region 108B associated with the radiator 108A of the heat exchanger 108 and the second region 106C associated with the second portion 106B of the duct 106, to form the second airflow path 104B. For example, based on the loading event 402, there may be a negative pressure that may be formed in the first region 108B. Due to such negative pressure of the first region 108B, the second actuator 114 may open the second flap 104 to receive the airflow along the second airflow path 104B, towards the heat exchanger 108, and cool the components of the vehicle 110.

In another embodiment, based on the detection of at least one event of: the fast-charging event where the battery associated with the vehicle 110 is charged, the uphill driving event where the vehicle 110 is configured to drive in the inclined plane, or the air-cooling event where the air conditioner associated with the vehicle 110 is configured to cool the vehicle 110, such as, based on the detection of the loading event 402, the second flap 104 may be activated based on the operation on one of: the electronic actuator, the electro-mechanical actuator, the pneumatic actuator, the magnetic actuator, or the hydraulic actuator. In an embodiment, the second flap 104 may be configured to selectively control the airflow in the second airflow path 104B, based on the activation of the second actuator 114. For example, when the components of the vehicle 110 are heavily loaded (such as excessive work done than required), in addition to the opening of the first flap 102, the second actuator 114 may open the second flap 104, to further receive the airflow along the second airflow path 104B, towards the heat exchanger 108, and additionally cool the components of the vehicle 110.

Figure 5:
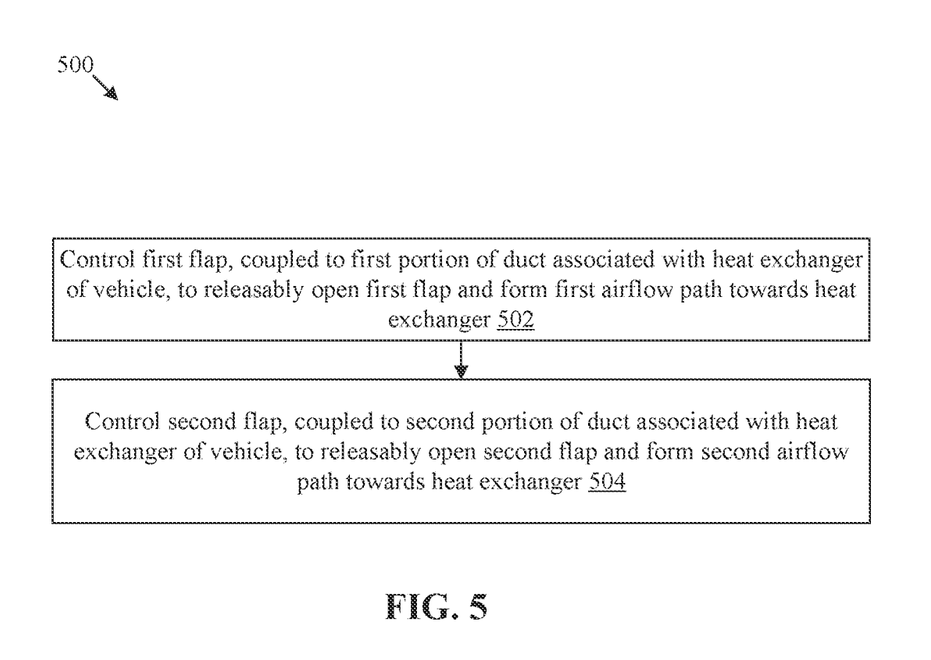
FIG. 5 is a flowchart that illustrates exemplary operations of the system of FIG. 1, in accordance with an embodiment of the disclosure.

FIG. 5 is a flowchart that illustrates exemplary operations of the system of FIG. 1, in accordance with an embodiment of the disclosure. FIG. 5 is explained in conjunction with elements from FIGS. 1A-1B, FIG. 2, FIG. 3, and FIG. 4. With reference to FIG. 5, there is shown a flowchart 500. The operations from 502 to 504 may be implemented, for example, by an operator, a manufacturer, or a control system 202 of the vehicle 110. The operations of the flowchart 500 may start at 502.

At 502, the first flap 102 may be controlled. In an embodiment, the operator, the manufacturer, or the control system 202 of the vehicle 110 may control the first flap 102, coupled to the first portion 106A of the duct 106 associated with the heat exchanger 108 of the vehicle 110, to releasably open the first flap 102 and form the first airflow path 102B towards the heat exchanger 108, as described further, for example, FIG. 1.

At 504, the second flap 104 may be controlled. In an embodiment, the operator, the manufacturer, or the control system 202 may control the second flap 104 coupled to the second portion 106B of the duct 106 associated with the heat exchanger 108 of the vehicle 110, to releasably open the second flap 104 and form the second airflow path 104B towards the heat exchanger 108 as described, for example, in FIG. 1.

The flow chart shown in FIG. 5 is illustrated as discrete operations, such as from 502 to 504, which relates to the control of the flaps (such as the first flap 102 or the second flap 104) of the system 100 associated with the vehicle 110. However, in certain embodiments, such discrete operations may be further divided into additional operations, combined into fewer operations, or eliminated, depending on the implementation without detracting from the essence of the disclosed embodiments.

For the purposes of the present disclosure, expressions such as "including", "comprising", "incorporating", "consisting of", "have", "is" used to describe, and claim the present disclosure are intended to be construed in a non-exclusive manner, namely allowing for items, components or elements not explicitly described also to be present. Reference to the singular is also to be construed to relate to the plural. Further, all joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

The foregoing description of embodiments and examples has been presented for purposes of illustration and description. It is not intended to be exhaustive or limiting to the forms described. Numerous modifications are possible considering the above teachings. Some of those modifications have been discussed and others will be understood by those skilled in the art. The embodiments were chosen and described for illustration of various embodiments. The scope is, of course, not limited to the examples or embodiments set forth herein but can be employed in any number of applications and equivalent devices by those of ordinary skill in the art. Rather it is hereby intended the scope be defined by the claims appended hereto. Additionally, the features of various implementing embodiments may be combined to form further embodiments.

What is claimed is:

1. A system, comprising:
a first flap coupled to a first portion of a duct associated with a heat exchanger of a vehicle, wherein the first flap is configured to form a first airflow path towards the heat exchanger; and
a second flap coupled to a second portion of the duct associated with the heat exchanger of the vehicle, wherein
the second flap is configured to form a second airflow path towards the heat exchanger,
the first airflow path is different from the second airflow path, and
a plane of the first airflow path is substantially perpendicular to a plane of the second airflow path.

2. The system according to claim 1, further comprising: a control system, wherein the control system is configured to:
control the first flap, via a first actuator, to selectively open the first portion of the duct to allow an airflow via the first airflow path; and
control the second flap, via a second actuator, to selectively open the second portion of the duct to allow the airflow via the second airflow path.

3. The system according to claim 2, wherein
the first actuator comprises one of: an electronic actuator, an electro-mechanical actuator, a pneumatic actuator, a magnetic actuator, or a hydraulic actuator, and
the first actuator is activated based on a mechanical operation on one of: the electronic actuator, the electro-mechanical actuator, the pneumatic actuator, the magnetic actuator, or the hydraulic actuator.

4. The system according to claim 2, wherein
the second actuator comprises a flow control valve,
the second actuator is activated based on one of: a pressure difference or a gravity difference, between a first region associated with a radiator of the heat exchanger and a second region associated with the second portion of the duct.

5. The system according to claim 2, wherein
the second actuator comprises one of: an electronic actuator, an electro-mechanical actuator, a pneumatic actuator, a magnetic actuator, or a hydraulic actuator, and
the second actuator is activated based on a mechanical operation on one of: the electronic actuator, the electro-mechanical actuator, the pneumatic actuator, the magnetic actuator, or the hydraulic actuator.

6. The system according to claim 5, wherein, in a failure event of the first flap and subsequent obstruction of the first airflow path,
the second actuator is activated based on the mechanical operation on one of: the electronic actuator, the electro-mechanical actuator, the pneumatic actuator, the magnetic actuator, or the hydraulic actuator, and
the second flap is configured to selectively control the airflow in the second airflow path, based on the activation of the second actuator.

7. The system according to claim 5, wherein, in at least one event of: a fast-charging event where a battery associated with the vehicle is charged, an uphill driving event where the vehicle is configured to drive in an inclined plane, or an air-cooling event where an air conditioner associated with the vehicle is configured to cool the vehicle,
the second actuator is activated based on the mechanical operation on one of: the electronic actuator, the electro-mechanical actuator, the pneumatic actuator, the magnetic actuator, or the hydraulic actuator, and
the second flap is configured to selectively control the airflow in the second airflow path, based on the activation of the second actuator.

8. The system according to claim 1, wherein the first portion of the duct is different from the second portion of the duct.

9. The system according to claim 1, further comprising a plurality of flaps disposed in the second portion of the duct, wherein,
a first set of the plurality of flaps are disposed on a first plane of the second portion; and
a second set of the plurality of flaps are disposed on a second plane of the second portion.

10. The system according to claim 9, wherein the first plane is located substantially perpendicular to the second plane.

11. The system according to claim 9, wherein
the first set of the plurality of flaps are selectively controlled to form a first air flow towards the heat exchanger, and
the second set of the plurality of flaps are selectively controlled to form a second air flow towards the heat exchanger, wherein,
the first air flow is substantially uniform compared to the second air flow.

12. The system according to claim 1, further comprising:
a first pivot element configured to movably pivot the first flap to releasably open the first portion of the duct and form the first airflow path towards the heat exchanger; and
a second pivot element configured to movably pivot the second flap to releasably open the second portion of the duct and form the second airflow path towards the heat exchanger.

13. The system according to claim 12, wherein
the first pivot element comprises one of: an edge hinge located at an edge of the first flap, a mid-hinge located at a mid-portion of the first flap, a living hinge integrally formed in the first flap, or a dual hinge disposed on opposing ends of the first flap; and
the second pivot element comprises one of: an edge hinge located at an edge of the second flap, a mid-hinge located at a mid-portion of the second flap, a living hinge integrally formed in the second flap, or a dual hinge disposed on opposing ends of the second flap.

14. The system according to claim 1, wherein
the first portion is a slot in the duct that is determined based on a layout of the vehicle, and
the first flap is coupled to the slot of the duct, based on the layout of the vehicle.

15. The system according to claim 1, wherein
the second portion is a slot in the duct that is determined based on a layout of the vehicle, and
the second flap is coupled to the slot of the duct, based on the layout of the vehicle.

16. The system according to claim 1, wherein, in a failure event of the first flap and subsequent obstruction of the first airflow path,
the second flap is activated based on one of: a pressure difference or a gravity difference, between a first region associated with a radiator of the heat exchanger and a second region associated with the second portion of the duct, to form the second airflow path.

17. The system according to claim 1, wherein, in at least one event of: a fast-charging event where a battery associated with the vehicle is charged, an uphill driving event where the vehicle is configured to drive in an inclined plane, or an air-cooling event where an air conditioner associated with the vehicle is configured to cool the vehicle,
the second flap is activated based on one of: a pressure difference or a gravity difference, between a first region associated with a radiator of the heat exchanger and a second region associated with the second portion of the duct, to form the second airflow path.

18. A control system, comprising:
circuitry configured to:
control a first flap, coupled to a first portion of a duct associated with a heat exchanger of a vehicle, to releasably open the first flap and to form a first airflow path towards the heat exchanger; and
control a second flap, coupled to a second portion of the duct associated with the heat exchanger of the vehicle, to releasably open the second flap and to form a second airflow path towards the heat exchanger, wherein
the first airflow path is different from the second airflow path, and
a plane of the first airflow path is substantially perpendicular to a plane of the second airflow path.

19. A method, comprising:
controlling a first flap, coupled to a first portion of a duct associated with a heat exchanger of a vehicle, to releasably open the first flap and to form a first airflow path towards the heat exchanger; and
controlling a second flap, coupled to a second portion of the duct associated with the heat exchanger of the vehicle, to releasably open the second flap and to form a second airflow path towards the heat exchanger, wherein
the first airflow path is different from the second airflow path, and
a plane of the first airflow path is substantially perpendicular to a plane of the second airflow path.

* * * * *